US011550923B2

(12) United States Patent
Weber

(10) Patent No.: US 11,550,923 B2
(45) Date of Patent: Jan. 10, 2023

(54) SYSTEMS AND/OR METHODS FOR STATIC-DYNAMIC SECURITY TESTING USING A TEST CONFIGURATOR TO IDENTIFY VULNERABILITIES AND AUTOMATICALLY REPAIR DEFECTS

(71) Applicant: Software AG, Darmstadt (DE)

(72) Inventor: Heiko Weber, Hösbach (DE)

(73) Assignee: SOFTWARE AG, Darmstadt (DE)

( * ) Notice: Subject to any disclaimer, the term of this patent is extended or adjusted under 35 U.S.C. 154(b) by 308 days.

(21) Appl. No.: 16/834,712

(22) Filed: Mar. 30, 2020

(65) Prior Publication Data

US 2021/0303696 A1 Sep. 30, 2021

(51) Int. Cl.
*G06F 21/57* (2013.01)
*G06F 11/36* (2006.01)

(52) U.S. Cl.
CPC ........ *G06F 21/577* (2013.01); *G06F 11/3664* (2013.01); *G06F 11/3684* (2013.01); *G06F 11/3688* (2013.01); *G06F 11/3692* (2013.01); *G06F 2221/033* (2013.01)

(58) Field of Classification Search
CPC ............... G06F 21/577; G06F 11/3664; G06F 11/3688; G06F 11/3692; G06F 2221/033
USPC ............................................................ 726/25
See application file for complete search history.

(56) References Cited

U.S. PATENT DOCUMENTS

| | | | | |
|---|---|---|---|---|
| 7,861,226 B1 * | 12/2010 | Episkopos | G06F 11/3676 | 717/124 |
| 7,975,296 B2 * | 7/2011 | Apfelbaum | G06F 21/577 | 726/25 |
| 8,528,093 B1 * | 9/2013 | Kureha | G06F 21/566 | 726/25 |
| 8,613,080 B2 * | 12/2013 | Wysopal | G06F 21/577 | 726/19 |

(Continued)

OTHER PUBLICATIONS

Gupta et al, "Static Analysis Approaches to Detect SQL Injection and Cross Site Scripting Vulnerabilities in Web Applications: A Survey", IEEE, pp. 1-5 (Year: 2014).*

(Continued)

*Primary Examiner* — Anil Khatri
(74) *Attorney, Agent, or Firm* — Nixon & Vanderhye P.C.

(57) ABSTRACT

Certain example embodiments test an application for security vulnerabilities. Binary and/or source code representations are subjected to static testing. Static testing identifies potential security weaknesses in the application. For each potential security weakness, a corresponding dynamic test set, containing one or more test cases, is generated based on (i) the corresponding potential security weakness, and (ii) lookups to weakness, application context, and attack pattern databases. The weakness database includes different weakness types and descriptions thereof. The attack pattern database includes information about how to generate attacks for the different weakness types. An instance of the application running in a test runtime environment is dynamically tested using the dynamic test cases. The dynamic test results verify whether each potential security weakness is a real (Continued)

vulnerability. The dynamic test results include fewer false-positives than the raw static test results. Verified security weakness of the application are repairable automatically.

25 Claims, 6 Drawing Sheets

(56) References Cited

U.S. PATENT DOCUMENTS

| | | | | |
|---|---|---|---|---|
| 9,021,260 | B1 * | 4/2015 | Falk | G06F 21/6218<br>713/165 |
| 9,195,829 | B1 * | 11/2015 | Goradia | G06F 21/55 |
| 9,317,399 | B2 | 4/2016 | Boshernitsan et al. | |
| 9,569,335 | B1 * | 2/2017 | Boehm | G06F 11/3692 |
| 9,612,943 | B2 | 4/2017 | Boshernitsan et al. | |
| 9,921,942 | B1 * | 3/2018 | Makohon | G06F 16/285 |
| 10,642,715 | B1 * | 5/2020 | Simca | G06F 11/3612 |
| 10,693,901 | B1 * | 6/2020 | Chan | H04L 67/02 |
| 10,713,152 | B2 * | 7/2020 | Huchegowda | G06F 11/3664 |
| 10,735,442 | B1 * | 8/2020 | Swackhamer | G06F 21/56 |
| 11,075,934 | B1 * | 7/2021 | Aldhaheri | G06F 21/00 |
| 11,087,002 | B2 * | 8/2021 | Siman | G06F 11/3672 |
| 11,354,409 | B1 * | 6/2022 | Kenefick | G06F 21/51 |
| 11,409,887 | B2 * | 8/2022 | Gourisetti | G06F 21/577 |
| 11,431,738 | B2 * | 8/2022 | Jeyakumar | G06F 16/986 |
| 2018/0330102 | A1 | 11/2018 | Siman et al. | |

OTHER PUBLICATIONS

Alenezi et al, "Open Source Web Application Security: A Static Analysis Approach", IEEE, pp. 1-5 (Year: 2016).*
Louridas, "Static Code Analysis", IEEE, pp. 58-61 (Year: 2006).*
Vishnyakov et al, "Symbolic Security Predicates: Hunt Program Weaknesses", IEEE, pp. 76-85 (Year: 2021).*
Mahadewa et al, "Identifying Privacy Weaknesses from Multi-party Trigger-Action Integration Platforms", ACM, pp. 2-15 (Year: 2021).*
Russo et al, "Dynamic vs. Static Flow-Sensitive Security Analysis", IEEE, pp. 186-199 (Year: 2010).*
Demaree et al, "An On-line Dynamic Security Analysis System Implementation", IEEE 1716-1772 (Year: 1994).*
Abad et al, "An Analysis on the Schemes for Detecting and Preventing ARP Cache Poisoning Attacks", IEEE, pp. 1-8 (Year: 2007).*
OWASP—"Who is the OWASP Foundation? OWASP Foundation, the Open Source Foundation for Application Security", <https://owasp.org/>, [retrieved Mar. 30, 2020], 3 pages, published on or before Mar. 29, 2020.
OWASP—"OWASP Top Ten", <https://owasp.org/www-project-top-ten/> [retrieved Mar. 30, 2020], 3 pages, published on or before Mar. 29, 2020.
CWE "Common Weakness Enumeration"—Individual Dictionary Definition (4.0), <https://cwe.mitre.org/data/definitions/1200.html>, [retrieved Mar. 30, 2020], 2 pages, published on or before Mar. 29, 2020.
CWE "Common Weakness Enumeration"—2019 Top 25 Most Dangerous Software Errors, <https://cwe.mitre.org/top25/archive/2019/2019-cwe-top25.html>, [retrieved Mar. 30, 2020], 7 pages, published on or before Mar. 29, 2020.
CWE, "Common Weakness Enumeration"—View the List of Weaknesses <https://cwe.mitre.org/index.html>, [retrieved Mar. 30, 2020], 1 page, published on or before Mar. 29, 2020.
CWE "Common Weakness Enumeration"—List Version 4.0, 2 <https://cwe.mitre.org/data/index.html>, [retrieved Mar. 30, 2020], 2 pages, published on or before Mar. 29, 2020.
(CAPEC) Common Attack Pattern Enumeration and Classification—View the List of Attack Patterns, <https://capec.mitre.org/>, [retrieved Mar. 30, 2020], 1 page, published on or before Mar. 29, 2020.
(CAPEC) Common Attack Pattern Enumeration and Classification—List Version 3.2, 3 <https://capec.mitre.org/data/index.html>, [retrieved Mar. 30, 2020], 3 pages, published on or before Mar. 29, 2020.
CWE "Common Weakness Enumeration"—Common Weakness Scoring System (CWSS) <https://cwe.mitre.org/cwss/cwss-v1.0.1html> [retrieved Mar. 30, 2020], 31 pages, published on or before Mar. 29, 2020.

* cited by examiner

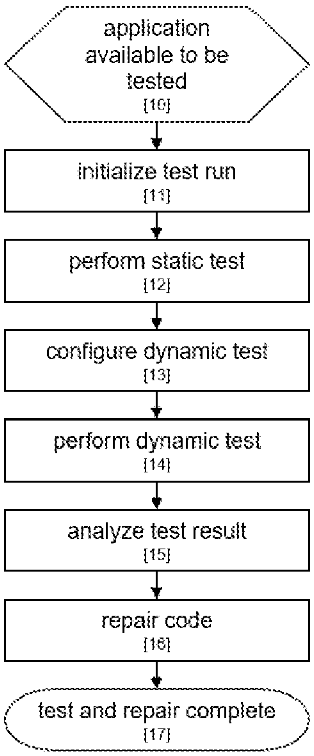
Fig. 1
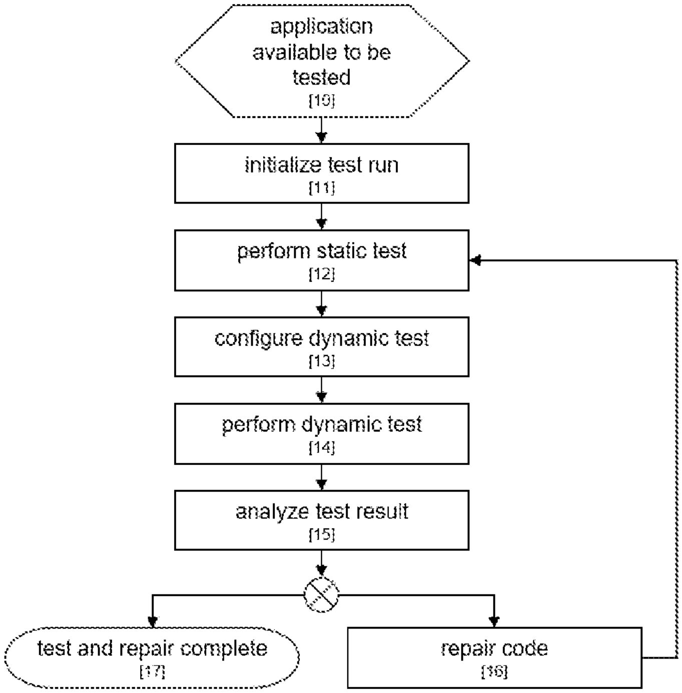
Fig. 2
Identified Weakness Instance (211)
| | |
|---|---|
| **ID** | **(212)** |
| **Type** | **(213)** |
| **Occurrence Location** | **(214)** |
| **Data Source Location** | **(215)** |
| **...** | |
Fig. 4

SYSTEMS AND/OR METHODS FOR STATIC-DYNAMIC SECURITY TESTING USING A TEST CONFIGURATOR TO IDENTIFY VULNERABILITIES AND AUTOMATICALLY REPAIR DEFECTS

TECHNICAL FIELD

Certain example embodiments described herein relate to techniques for testing software applications for security vulnerabilities. More particularly, certain example embodiments described herein relate to systems and/or methods for combined static-dynamic testing approaches useful for testing applications and for enabling automatic repair of defects.

BACKGROUND AND SUMMARY

The "security by design" software development approach requires that security aspects are considered in all phases of the software development lifecycle. But even when this software development approach is used, software developers and testers typically place a large emphasis on testing software for potential software problems, e.g., using automated testing tools. And when security by design is not strictly adhered to during software development, even more resources may be expended on testing for potential software problems.

Automated testing tools generally have one of two basic types, namely, tools for static testing, and tools for dynamic testing. In general, static testing approaches analyze the source code or binaries of an application and have insight into all possible code execution paths. Unfortunately, however, they tend to rely on many assumptions about "real" code execution environments. Moreover, these approaches generally only identify weaknesses based on these assumptions and do not, for example, have proactive mechanisms to verify the weaknesses in real runtime contexts or seek to remediate found problems.

By contrast, dynamic testing approaches in general analyze running applications in the deployed execution environment. This addresses some of the assumptions that might be made in static testing approaches. Unfortunately, however, dynamic testing approaches typically rely on a long execution time where many possible attack inputs are tried in order to find real vulnerabilities.

One challenge associated with static testing is that the results tend to include many false-positives, and the results typically will need to be manually verified to identify the real vulnerabilities. And if the tests are configured to reduce the number of false-positives, it is typical for some important weaknesses to go undiscovered or unreported. On the other hand, because dynamic testing can take an extremely long time to complete, if there is large number of possible inputs to be tested, and/or if only a small fraction of possible tests are to be executed, many real vulnerabilities may not be found.

Static and dynamic security testing tools have been available for several decades now, and they have been improving over time. For example, static testing tools have improved in terms of achieving lower false-positive rates. This improvement to static testing tools has been achieved by creating and leveraging more sophisticated graph analysis approaches with respect to execution paths, and by incorporating more context information about the code execution environments into the analysis. In addition, improvements have been made to tools that analyze test results to identify false-positives and/or to identify similar issues in an application once one or more other problems have been found. Dynamic security testing tools, on the other hand, have been improving in terms of reducing the time to find relevant issues, e.g., by implementing more complex strategies concerning how to set up and organize the testing sequences.

Nevertheless, it will be appreciated that static security testing still will identify a large number of false-positives that need to be manually assessed, and that dynamic security testing still is unable to ensure that all possible code execution paths and all possible input variants are properly tested for.

Certain example embodiments help address the above-described and/or other concerns. For example, certain example embodiments help improve software security testing tools, improving upon static and dynamic testing approaches, e.g., by reducing false-positive rates, reducing the time needed to obtain good data from an actual deployment environment, automatically repairing detected defects, and/or the like.

One aspect of certain example embodiments relates to the ability to have static and dynamic tests work together with one another to improve security testing tools. For example, certain example embodiments are able to create dynamic tests based on the results of static tests.

Another aspect of certain example embodiments relates to using static tests to identify areas to be focused on from a security perspective, and dynamically adapting code (e.g., including or omitting code sections) in order to help assess the security status of an application.

In certain example embodiments, a method of testing an application for security vulnerabilities is provided. The application has binary and/or source code representations. The method comprises: (a) subjecting the binary and/or source code representations to static testing to generate raw static test results, the raw static test results indicating one or more potential security weaknesses in the application, at least one of the one or more potential security weaknesses being a false-positive; (b) generating, for each potential security weakness, a corresponding dynamic test set, including one or more dynamic test cases, each dynamic test set being generated in dependence on (i) the corresponding potential security weakness, and (ii) lookups to a weakness data set, an application context data set, and an attack pattern data set, wherein the weakness data set includes an enumeration of different weakness types and descriptions thereof, the application context data set includes information specific to the application, and the attack pattern data set includes information about how to generate attacks for the different weakness types enumerated in the weakness data set; (c) subjecting an instance of the application running in a test runtime environment to the generated dynamic test case(s) to generate dynamic test results, the dynamic test results indicating whether each of the one or more potential security weakness is a verified security weakness of the application, the dynamic test results including fewer false-positives than the raw static test results; and (d) outputting a listing of each verified security weakness of the application.

In certain example embodiments, a non-transitory computer readable storage medium tangibly storing a program for testing an application for security vulnerabilities is provided. The application has binary and/or source code representations. The program, when executed by a computing system including at least one processor, performs functionality comprising: (a) subjecting the binary and/or source code representations to static testing to generate raw static test results, the raw static test results indicating one or more potential security weaknesses in the application, at least one of the one or more potential security weaknesses being a false-positive; (b) generating, for each potential security weakness, a corresponding dynamic test set, including one or more dynamic test cases, each dynamic test set being generated in dependence on (i) the corresponding potential security weakness, and (ii) lookups to a weakness data set, an application context data set, and an attack pattern data set, wherein the weakness data set includes an enumeration of different weakness types and descriptions thereof, the application context data set includes information specific to the application, and the attack pattern data set includes information about how to generate attacks for the different weakness types enumerated in the weakness data set; (c) subjecting an instance of the application running in a test runtime environment to the generated dynamic test case(s) to generate dynamic test results, the dynamic test results indicating whether each of the one or more potential security weakness is a verified security weakness of the application, the dynamic test results including fewer false positives than the raw static test results; and (d) outputting a listing of each verified security weakness of the application.

In certain example embodiments, a computing system for testing an application for security vulnerabilities is provided. The application has binary and/or source code representations. The computing system comprises at least one processor and a first electronic interface to an instance of the application running in a test runtime environment. The at least one processor is configured to control the computing system to at least: (a) subject the binary and/or source code representations to static testing to generate raw static test results, the raw static test results indicating one or more potential security weaknesses in the application, at least one of the one or more potential security weaknesses being a false-positive; (b) generate, for each potential security weakness, a corresponding dynamic test set, including one or more dynamic test cases, each dynamic test set being generated in dependence on (i) the corresponding potential security weakness, and (ii) lookups to a weakness data set, an application context data set, and an attack pattern data set, wherein the weakness data set includes an enumeration of different weakness types and descriptions thereof, the application context data set includes information specific to the application, and the attack pattern data set includes information about how to generate attacks for the different weakness types enumerated in the weakness data set; (c) subject the instance of the application running in the test runtime environment to the generated dynamic test case(s) to generate dynamic test results, the dynamic test results indicating whether each of the one or more potential security weakness is a verified security weakness of the application, the dynamic test results including fewer false positives than the raw static test results; and (d) output a listing of each verified security weakness of the application.

According to certain example embodiments, the listing of verified security weakness(es) of the application may include, for each verified security weakness, an indication of a location of where in the binary and/or source code representation(s) the respective verified security weakness occurs.

According to certain example embodiments, the binary and/or source code representation(s) of the application may be automatically modified to repair one or more of the verified security weaknesses.

According to certain example embodiments, the raw static test results may indicating one or more potential security weaknesses in the application may each include an identifier for each potential security weakness, a first location of where in the binary and/or source code representation(s) the respective potential security weakness is caused to occur, and/or a second location of where data causing the potential security weakness enters the binary and/or source code representation(s), e.g., with the identifier specifying an entry in the weakness data set.

According to certain example embodiments, each potential security weakness may be assigned a severity score during the generation of the raw static test results; and the binary and/or source code representation(s) of the application may be automatically modified to repair one or more of the verified security weaknesses in an order determined by respective severity scores.

According to certain example embodiments, the binary and/or source code representation(s) of the application may be automatically modified to repair one or more of the verified security weaknesses output in (d), and (a)-(d) may be repeated until no verified security weaknesses result from the dynamic testing.

According to certain example embodiments, each dynamic test case may include at least one attack vector, e.g., with the attack vector(s) being generated using the second location and in connection with the attack pattern data set, and the attack vector(s) being executable against the instance of the application running in the test runtime environment during the dynamic testing.

According to certain example embodiments, dynamic tests may be performed for a plurality of instances of the application running in different test runtime environments, e.g., with dynamic test results being collected for the different instances.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a flowchart showing an overall processing flow according to certain example embodiments;

FIG. 2 is a flowchart showing how the FIG. 1 example process can be modified to incorporate repair verification in accordance with certain example embodiments;

FIG. 4 is a minimal weakness instance data structure in accordance with certain example embodiments;

DETAILED DESCRIPTION

Figure 3:
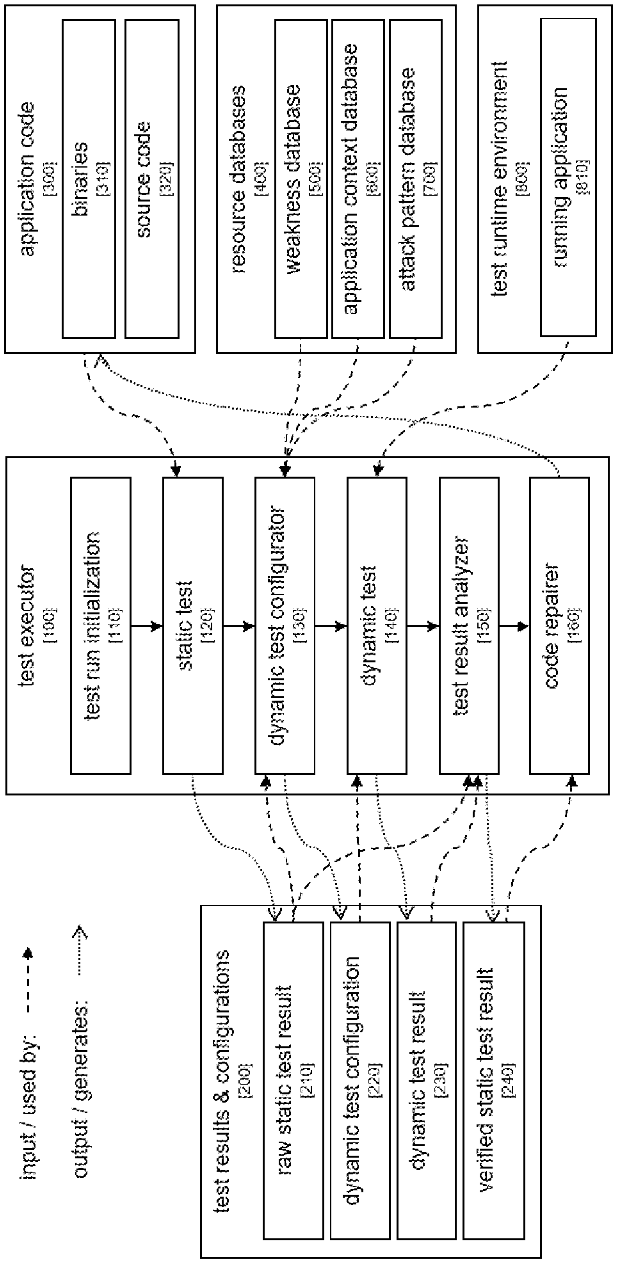
FIG. 3 is a block diagram showing components of an example static-dynamic test system according to certain example embodiments.

Certain example embodiments relate to static-dynamic security testing to identify vulnerabilities using a test configurator, as well as automatic defect repair. In certain example embodiments, static and dynamic testing are combined in a way in which weaknesses identified from static testing are automatically verified using dynamic testing. Thus, certain example embodiments advantageously are able to improve conventional security testing tools by, for example, identifying real vulnerabilities much faster and more reliably compared to using either testing approach on its own, or even using each approach without basing the results of one on the other. Typically, in conventional approaches, having a large number of potential identified weaknesses is not useful because further verification processes aimed at eliminating false-positives require time-consuming manual intervention and therefore may not be feasible. However, by providing a way to automatically verify potential weaknesses and reduce (and potentially even eliminate all) false-positives, it becomes possible to work with scans that scan for large number of weakness types to produce a large set of potential issues in their results. Moreover, having verified which of the weaknesses are real vulnerabilities, and being able to map them back to the areas in the application code that contain the program defects, also advantageously allow for automated repair of the programming defects in the application. In other words, if there is no way to automatically verify whether an identified weakness is a real vulnerability (i.e., such verification has to be performed manually), then it is not practical to include checks for large number of potential software errors, as the list of identified weaknesses will be so long that it will be impossible (or at least impractical) to verify them all. Indeed, it is common for static security scanners to be configured to only focus on the most relevant or potentially impactful errors. For instance, some static security scanners focus only on the Open Web Application Security Project (OWASP) Top 10 or the Common Weakness Enumeration (CWE) Top 25. This means that many other issues are not included in the scan, even though they still could pose major security threats. By providing an approach for automatically verifying the identified weaknesses, certain example embodiments improve existing security scanner tools. That is, there is a technical improvement in that it does not matter how long the list is, as by scaling up the verification infrastructure, millions on weaknesses can be verified in a few hours, which would take a person many years or many persons still many weeks, to do manually, and security issues that otherwise would not even be scanned for can be found, verified, and (if necessary) remediated. By including more types of static test, more defects can be identified, improving the overall the security of the software application.

In certain example embodiments, static security testing tools provide at least the following information for each identified weakness as a result of a security scan: (a) a unique classification of the weakness, (b) the code/binary location where the weakness occurs, and (c) the code/binary location where the data that causes the weakness entered the application. Items (a) and (c) are pieces of information from a static security test that are used to automatically configure the dynamic security scan of certain example embodiments. Further, additional information is used to map (c) to the runtime interfaces of the application to be tested using dynamic testing tools. Also based on (a), additional information helps decide on how to create the proper attack data and input requests to the application to try and exploit the identified weakness. Generating specific dynamic tests for each identified weakness allows for the generation of test results for each identified weakness. Based on these results, each of the identified weaknesses can be marked in the raw static test results as correct and those defects with automated application code repairing can be focused on, based on information in (b).

FIG. 1 is a flowchart showing an overall processing flow according to certain example embodiments. The application to be tested is made available in step 10. The static test run is initialized in step 11, and the static test is performed in step 12. The dynamic test is configured in step 13 based on output from the static test, and the dynamic test is performed in step 13. In step 15, the test results are analyzed. Code is repaired in step 16. Testing and repair are deemed complete in step 17.

To verify the automated repair of the code, a processing loop can be integrated into the FIG. 1 process. The processing loop would in essence repeat the static and dynamic testing until all verified weaknesses (or at least all verified weaknesses of a predefined severity level are resolved). In this regard, FIG. 2 is a flowchart showing how the FIG. 1 example process can be modified to incorporate repair verification in accordance with certain example embodiments. FIG. 2 is similar to FIG. 1, except that there is a branch after analysis of the test results in step 15. That is, if there is no more code to be repaired and testing is complete, the left branch is taken, and the process terminates with step 17. On the other hand, once code is repaired in step 16 (following test result analysis in step 15), the process can branch back to performing the static testing in step 12. The repaired (or at least partially repaired) application then can be subject to the same procedure as before, e.g., with the static testing being performed in step 12, its results being used to configure the dynamic testing in step 13, the dynamic testing being performed in step 14, etc.

Example Implementation

Details concerning an example implementation are provided below. It will be appreciated that this example implementation is provided to help demonstrate concepts of certain example embodiments, and aspects thereof are non-limiting in nature unless specifically claimed. For instance, certain example threat database, attack signature patterns (and attack signature pattern listings), interface types, database types, etc., are provided below to ease understanding of the example embodiments described herein and are not limiting unless explicitly claimed.

FIG. 3 is a block diagram showing components of an example static-dynamic test system according to certain example embodiments. A software application to be tested for security problems includes application code 300 that will typically contain some binaries 310, e.g. third-party libraries and compiled libraries of its own, as well as source code 320. This same software application also is deployed as a running application 810 in a test runtime environment 800. The application code 300 may be stored to a local computer readable storage medium, accessed over the network, loaded in memory, etc. For instance, the application source code 320 may be stored in source code repositories (e.g., SVN, Git, Perforce, CVS, etc.) and the binaries 310 may be stored in artifact repositories (e.g., Apache Archiva, Artifactory, Nexus, etc.). The test runtime environment 800 may include a computing system comprising at least one processor and a memory configured backing the running application 810. The test runtime environment 800 may include network and/or other interfaces, computing resources (e.g., disk, memory, etc.), and/or simulations thereof, which would be typical of an actual deployment.

The test executor 100 is the main controller of a test run and triggers functionality described below. The test executor 100 in this sense may be hosted on a computing device local to or remote from one or both of the application code 300 and the test runtime environment 800. It may include processing resources including at least one processor and memory of its own, interfaces to the storage backing the application code, the computing system hosting the test runtime environment 800, etc. These interfaces may include network connections, Application Programming Interface (API) linkages available via programmatic calls, command line interfaces, and/or the like. Specific examples are provided below. In certain example embodiments, the test executor 100 may be a computer program, executable by processing resources, and the static testing, dynamic testing, result analysis, code repair, etc., may be implemented as software modules thereof.

First, the parameters that are needed to configure the functions of the test run are gathered when the test executor 100 initializes the test run 110. This includes information about where the application code 300, running application 810, and resource databases 400 are located. The resource databases 400 may include a weakness database 500, application context database 600, and attack pattern database 700. The databases may be stored to one or more computer readable storage mediums in any suitable format. They may be accessible via database management system calls, API calls, queries, and/or the like. Specific example database types, query language, etc., as well as reasons for which the various databases may be used in certain example embodiments, are provided below.

Second, the static test 120 performs a static security analysis based on the application code 300. The static test 120 identifies weaknesses in the binaries 310 and/or the source code 320 of the software application. The result of this analysis is returned as the raw static test results 210. As is typical with conventional static testing, the results returned by the static test 120 at least on an initial pass might possibly contain many false-positives.

Third, based on the raw static test results 210 and information in the weakness database 500, application context database 600, and attack pattern database 700, the dynamic test configurator 130 (*a*) generates a set of dynamic test cases for each identified weakness in the raw static test results 210 and (b) generates the dynamic test configuration 220.

Fourth, the dynamic test 140 uses the instructions of the dynamic test configuration 220 to execute a specific set of tests against the running application 810 for each identified weakness in the raw static test results 210. The dynamic test 140 records the test result, including a reference to the associated identified weakness, in the dynamic test results 230.

Fifth, the test result analyzer 150 uses the dynamic test results 230 and raw static test results 210 to map the verified vulnerabilities to the identified weaknesses to generate the verified static test results 240. The verified static test results 240 then will contain only the identified weaknesses that have been proven to be exploitable in the running application 810. In other words, at this point, false-positives will be in essence filtered out and will not be included in the verified static test results 240.

Sixth, based on the information of the verified static test results 240, the code repairer 160 modifies the binaries 310 and/or the source code 320 to eliminate or mitigate the defects.

Similar to the technological backbone of the resource databases 400, the test results and configurations data store 200 may be backed by a non-transitory computer readable storage medium and may store its data in a database or any other suitable data structures. For instance, dynamic test configurations 220 may be stored in an XML, JSON, or other structured or unstructured format. Results including the raw static test results 210, dynamic test results 230, and verified static test results 240 may be stored in report format, in a database with pointers to test parameters and other information associated with therewith (such as, for example, date/time of test, test identification, version of the application code 300 under test, etc.), and/or the like. Specific examples of storage techniques, interface methods, query languages, etc., are provided below.

Further details regarding the components of the test executor 100 will now be provided.

Example Test Run Initialization

The test run initialization 110 configures the information sources to be used by components of the test executor 100. For example, the test run initialization 110 includes information defining how to access the following resources, which are used as input and/or output when operating the components: references to binaries 310, references to source code 320, references to running application 810, references to weakness database 500, references to application context database 600, and references to attack pattern database 700.

References to binaries 310 point to the repositories that contain the build artifacts, such as third-party libraries or any other binaries for which the source code is not available. Common systems that are used during build time support standard APIs, such as WebDAV, HTTP, REST, etc.

References to source code 320 point to the source code repositories that store the application source code. Because common commercial static testing tools support common programming languages, this may in certain example embodiments point to multiple repositories containing source code in multiple programming languages. Commonly used source code repositories, such as Git, SVN, Perforce, etc., have standardized APIs to access the information stored in them.

References to running application 810 point to the electronic interfaces, e.g. network interfaces, command line interfaces, etc., through which the installed application is accessible.

References to weakness database 500 point to a database that provides details about the weaknesses that are reported by the static test 120. Because Common Weakness Enumeration identifiers (CWE-IDs) are the de facto standard for classifying weaknesses, this may in certain example embodiments be a reference to a CWE Common Weakness Enumeration (CWE) database. In a similar vein, because an XML representation of this database exists, an XML structure may be queried, e.g., using an XML query language such as XQuery or the like. As is known, the CWE database is a community-developed list of common software and hardware security weaknesses.

References to application context database 600 point to a database that provide application-specific context information, providing information specific to the application that is being tested. Because this database may in certain example implementations be managed by the specific application development team, it may be generated using application documentation that is also used for other purposes and could be exposed using standard APIs, such as REST, SOAP, and/or the like.

References to attack pattern database 700 point to a database that contains information on how to generate an attack to test for a specific weakness. Because the Common Attack Pattern Enumeration and Classification (CAPEC) list contains attack patterns, which are referenced to from the CWE list, this database could be used. Furthermore, because an XML representation of this database exists, an XML structure may be queried using an XML query language, such as XQuery or the like. As is known, CAPEC provides a comprehensive dictionary of known patterns of attack employed by adversaries to exploit weaknesses in cyber-enabled capabilities.

Example Static Testing

For the static testing, common Static Application Security Testing (SAST) tools are used, as commercially available tools in that category provide information that is useful for the operations described herein. A variety of information may be included in the test results for each identified weakness. First, the CWE-ID may be included. A CWE-ID is a unique identifier that classifies a weakness type based on the CWE List. Second, the code/binary location where the weakness occurs may be included. This may be a reference to the exact location in the source code or binary, identified by filename and location in that file for example, where the defect that causes the weakness is located. Third, the code/binary location where the data that causes the weakness entered the application may be included. This may be a reference to the exact location in the source code or binary, identified by filename and location in that file for example, where the data that causes the weakness to occur at the previous location described above enters into the application. The static test 120 generates a list of identified weaknesses 211 in a common machine-readable format. For example, XML format may be used for this purpose.

The raw static test results 210 contain a list or identified weakness instances 211. Each identified weakness instance 211 contains at least the data fields shown in FIG. 4. FIG. 4 in this sense is a minimal weakness instance data structure in accordance with certain example embodiments. As can be seen from FIG. 4, the data structure includes an identifier 212, a weakness type 213, an occurrence location 214, and a data source location 215. Various other information may be included, as well. For instance, a Common Weakness Scoring System (CWSS) score or other type of severity score that can be used to prioritize the examination of the weakness instances may be included. It will be appreciated that because certain example embodiments provide for automatic verification of whether a weakness is a vulnerability, a variety of scoring methodologies can be used. Indeed, because manual assessment of the identified weakness instances is not required by virtue of the automation, the need to focus first on the highest priority/severity may be reduced since all issues (or at least all issues above a predetermined severity level threshold or with a predetermined priority) will be ultimately addressed and, programmatically, can be addressed in order (e.g., highest severity to lowest severity) if so desired.

As an example, assume that an operating system (OS) command injection weakness (CWE-ID 78) is identified to occur in the source code ProcessCommand.java at line 6328 where the data that causes this weakness enters the application in the source code ARGWebInterface.java at line 635. The static testing techniques described herein could create a structure as presented in the following example code listing.

```
<weaknessInstance xmlns="http://namespaces.softwareag.com/security"
  id="INS-1234">
  <description>When setting the host name of a managed Tamino
    database host via the command SETMANAGEDHOSTS using the ARG
    web interface, the input value of the host name will be passed
    to an operating system call and is not properly checked,
    thereby allowing an attacker to execute arbitrary commands by
    specially constructed host names.</description>
  <type class="CWE">78</type>
  <occurrenceLocation>
    <file>ProcessCommands.java</file>
    <line>6328</line>
  </occurrenceLocation>
  <dataSourceLocation>
    <file>ARGWebInterface.java</file>
    <line>635</line>
  </dataSourceLocation>
</weaknessInstance>
```

It will be appreciated that, in this example listing, a description related to the weakness is optionally included.

Example Dynamic Test Configurator

Figure 5:
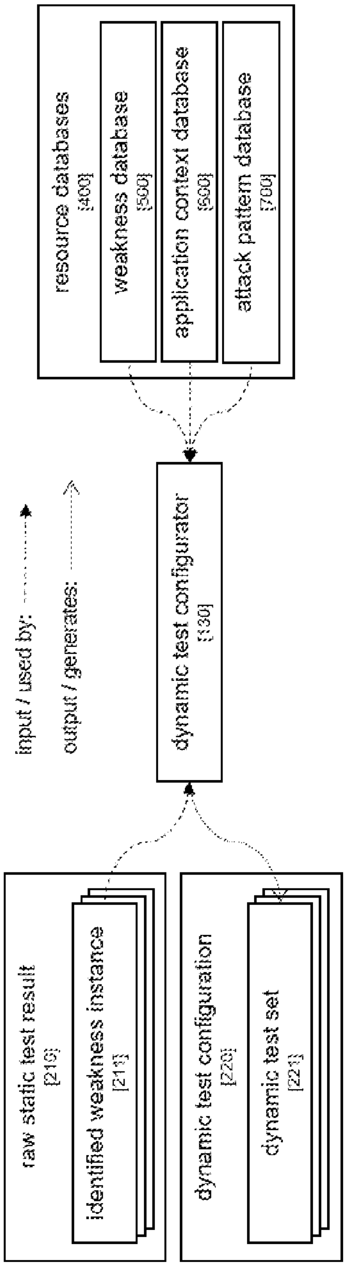
FIG. 5 is a block diagram showing further detail of how a dynamic test configurator may work, in accordance with certain example embodiments.

FIG. 5 is a block diagram showing further detail of how a dynamic test configurator 130 may work, in accordance with certain example embodiments. The dynamic test configurator 130 uses the output of the static test 120 (included in the raw static test results 210) and analyzes each identified weakness instance 211 to generate a dynamic test set 221 for each identified weakness instance 211. Multiple dynamic tests may be created in this regard. The dynamic test sets 221 are a part of the dynamic test configuration 220 to be executed by the dynamic test 140. A dynamic test set 221 in turn is used to evaluate whether an identified weakness instance 211 can be exploited in the running application 810. In certain example embodiments, for each identified weakness instance 211, there is a dynamic test set 221 created, which includes one or more dynamic test cases 222.

Figure 6:
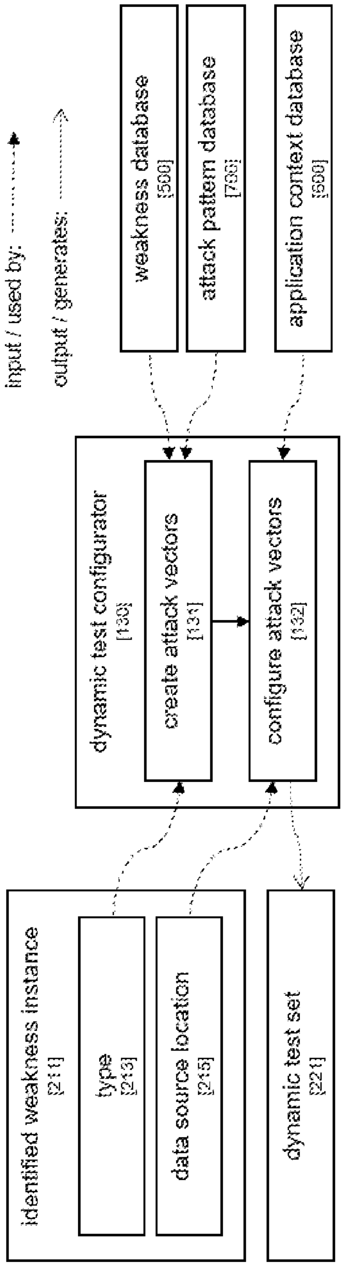
FIG. 6 is a block diagram demonstrating how attack vectors can be created and configured in accordance with certain example embodiments.

FIG. 6 is a block diagram demonstrating how attack vectors can be created and configured in accordance with certain example embodiments. As can be seen from FIG. 6, in certain example embodiments, the dynamic test configurator 130 operates in two phases when generating the dynamic test set 221. First, creation of attack vectors 131 is performed. Using the identified weakness instance type 213, information from the weakness database 500 and the attack pattern database 700 can be extracted. Second, configuration of attack vectors 132 is performed based on, e.g., information from the application context database 600. This configuration is used to execute the attack patterns against the running application 810, using the data source location 215 to identify the application interface 603 or other vulnerability injection point. Each created attack vector, once it has been configured to be executed against the running application 810, may be thought of as constituting a dynamic test case 222.

The weakness database 500 contains information about types of weaknesses. It thus may be used to help automatically create attack vectors, identify attack vectors used for exploiting certain weaknesses, etc. As indicated above, the CWE list is a common weakness database that may be used in connection with certain example embodiments.

The CWE List is available in XML format and contains a list of common weakness types. An excerpt of the entry for the CWE-ID 78 (OS command injection) is shown in the listing below. Information relevant to creating an attack vector is given below. It will be appreciated that the information most relevant to creating an attack pattern based on this exploit is the list of references to CAPEC attack patterns in the XML element Related_Attack_Patterns. That is because the CAPEC as a whole provides a comprehensive dictionary of known patterns of attack, and the identifiers here refer to specific attack patterns that are associated with the particular CWE-ID 78 weakness type.

```
<Weakness xmlns="http://cwe.mitre.org/cwe-6" ID="78" Name="Improper
  Neutralization of Special Elements used in an OS Command ('OS
  Command Injection')" ...>
  . . .
  <Applicable_Platforms>
    <Language Class="Language-Independent"
      Prevalence="Undetermined"/>
  </Applicable_Platforms>
  . . .
  <Common_Consequences>
    <Consequence>
      <Scope>Confidentiality</Scope>
      <Scope>Integrity</Scope>
      <Scope>Availability</Scope>
      <Scope>Non-Repudiation</Scope>
      <Impact>Execute Unauthorized Code or Commands</Impact>
      <Impact>DoS: Crash, Exit, or Restart</Impact>
      <Impact>Read Files or Directories</Impact>
      <Impact>Modify Files or Directories</Impact>
      <Impact>Read Application Data</Impact>
      <Impact>Modify Application Data</Impact>
      <Impact>Hide Activities</Impact>
      <Note>Attackers could execute unauthorized commands, which
        could then be used to disable the software, or read and
        modify data for which the attacker does not have
        permissions to access directly. Since the targeted
        application is directly executing the commands instead of
        the attacker, any malicious activities may appear to come
        from the application or the application's owner.</Note>
    </Consequence>
  </Common Consequences>
  . . .
  <Related_Attack_Patterns>
    <Related_Attack_Pattern CAPEC_ID="108"/>
    <Related_Attack_Pattern CAPEC_ID="15"/>
```

-continued

```
    <Related_Attack_Pattern CAPEC_ID="43"/>
    <Related_Attack_Pattern CAPEC_ID="6"/>
    <Related_Attack_Pattern CAPEC_ID="88"/>
  </Related_Attack_Patterns>
  . . .
</Weakness>
```

The application context database 600 contains information about the software application which allows the interfaces of the application to be located. This information is useful because it can be used in the automatic creation of a dynamic test case 222 to verify an identified weakness instance 211. In certain example embodiments, relevant application code areas that contain interfaces to the application to accept inputs or create outputs may be described in the application context database 600 using an application context area 601.

Figure 7:
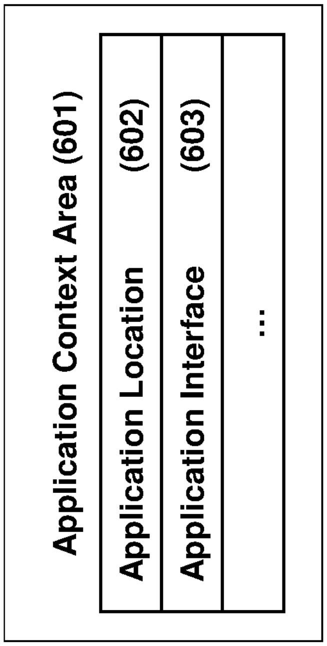
FIG. 7 is an example application context area data structure, which may be used in certain example embodiments.

In this regard, FIG. 7 is an example application context area 601 data structure, which may be used in certain example embodiments. As shown in FIG. 7, the application context area 601 includes an application location 602 and an application interface 603 and, optionally, additional information about the application or a portion of it. The application location 602 contains a description of the code locations that the context describes. This can include in the simplest format just a source code filename and the line(s) of code to which this context area applies. It can however also be a list of function names or other identifiers that can be mapped to data source location 215 of an identified weakness instance 211. In certain example embodiments, some context area instances may include simple locational information, whereas others may include more detailed information. The application interface 603 describes the type of interface of the application that receives the input or generates the output in the applicable application context.

As an example, the following listing describes an application context that includes the source code which receives and processes the data that is passed as input to a web interface:

```
<applicationContextArea
  xmlns="http://namespaces.softwareag.com/security">
  <applicationLocation file="ARGWebInterface.java" lineFrom="612"
    lineTo="742" />
  <applicationInterface type="input">
    <webInterface protocol="HTTP">
      <basePath>arg?c=SETMANAGEDHOSTS </basePath>
      <parameters>
        <parameter name="hostname" dataType="char" minLen="1"
          maxLen="255" />
      </parameters>
      <command>addhost={hostname}</command>
    </webInterface>
  </applicationInterface>
</applicationContextArea>
```

If the application location cannot be specified using the scoped lines in the source code, there is also the possibility to reference to a function/method in the code. Indeed, at least some static testing tools may report the function or method that constitutes the data source that leads to an identified weakness.

The attack pattern database 700 provides additional information for choosing the correct attack vector to be executed by the dynamic test 140. Depending on the database that is used, either the entries in the attack pattern database 700 will point to a corresponding weakness type, or the weakness database 500 will point to the attack pattern in the attack pattern database 700. A common attack pattern database, which is referenced to by the CWE entries, is CAPEC. This database can be used to identify one or more attack vectors to be used when creating the dynamic test cases.

The following example listing shows an excerpt of the attack pattern to find and exploit an OS command injection (CWE-ID 78). This example is taken from the CAPEC list and is the CAPEC-88 entry, which is referenced to in the weakness description of CWE-78:

```
<Attack_Pattern xmlns="http://capec.mitre.org/capec-3" ID="88"
  Name="OS Command Injection" . . . >
  <Description>In this type of an attack, an adversary injects
    operating system commands into existing application functions.
    An application that uses untrusted input to build command
    strings is vulnerable. An adversary can leverage OS command
    injection in an application to elevate privileges, execute
    arbitrary commands and compromise the underlying operating
    system.</Description>
  . . .
  <Execution_Flow>
      . . .
      <Attack_Step>
        <Step>3</Step>
        <Phase>Experiment</Phase>
        <Description>[Vary inputs, looking for malicious results.]
          Depending on whether the application being exploited is a
          remote or local one the attacker crafts the appropriate
          malicious input, containing OS commands, to be passed to
          the application</Description>
        <Technique>Inject command delimiters using network packet
          injection tools (netcat, nemesis, etc.)</Technique>
        <Technique>Inject command delimiters using web test
          frameworks (proxies, TamperData, custom programs,
          etc.)</Technique>
      </Attack_Step>
      . . .
  </Execution_Flow>
  <Prerequisites>
      <Prerequisite>User controllable input used as part of commands
        to the underlying operating system.</Prerequisite>
  </Prerequisites>
  . . .
</Attack_Pattern>
```

The Attack_Step in the Phase "Experiment" describes the operations that are executed to test for the presences of a vulnerability if the location of how and where to the send the attack data is already known. This type of information may be used choose the correct dynamic test types to exploit a vulnerability.

For each identified test vector for a certain identified weakness instance 211, one of more test cases 222 are created. The dynamic test case 222 is the instruction for the dynamic test engine on how to perform the dynamic test 140.

Figure 8:
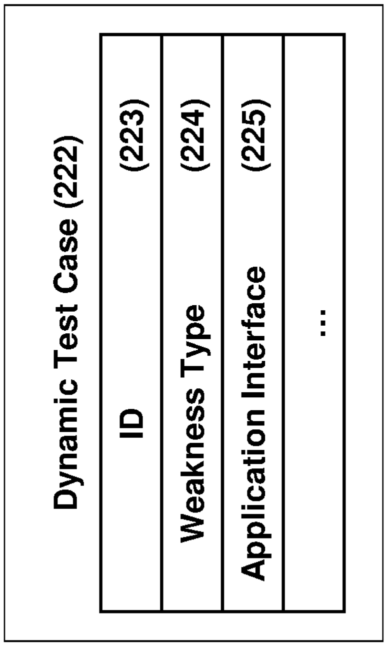
FIG. 8 is an example dynamic test case data structure that may be used in connection with certain example embodiments.

In this regard, FIG. 8 is an example dynamic test case 222 data structure, which may be used in certain example embodiments. As shown in FIG. 8, the dynamic test case 222 includes at least an identifier 223, a weakness type 224, and a description of the application interface 225.

As an example, for the OS command injection weakness (CWE-ID 78) in a web interface, a dynamic test case 222 can be described as follows:

```
<dynamicTestCase xmlns="http://namespaces.softwareag.com/security"
  ID="INS-1234-1">
  <weaknessType class="CWE">78</weaknessType>
  <applicationInterface type="input">
    <webInterface protocol="HTTP">
```

-continued

```
      <basePath>arg?c=SETMANAGEDHOSTS </basePath>
      <parameters>
        <parameter name="hostname" dataType="char" minLen="1"
          maxLen="255" />
      </parameters>
      <command> addhost={hostname}</command>
    </webInterface>
  </applicationInterface>
</dynamicTestCase>
```

Figure 9:
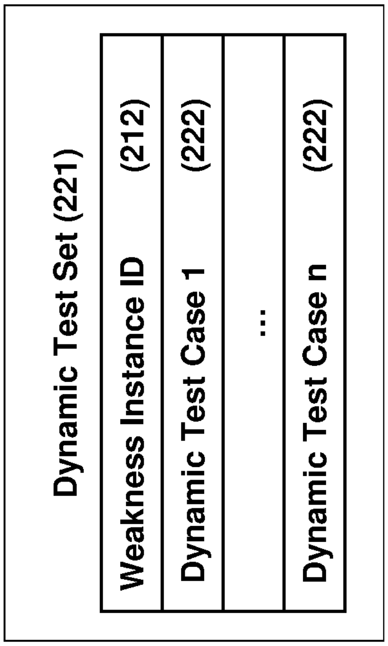
FIG. 9 is an example dynamic test set data structure that may be used in connection with certain example embodiments.

FIG. 9 is an example dynamic test set data structure that may be used in connection with certain example embodiments. Because a dynamic test set 221 is generated for each identified weakness instance 211, the identified weakness instance id 212 is stored with each test set, along with the one or more dynamic test cases 222. Thus, the test result analyzer 150 can match the results of the dynamic test 140 back to a specific identified weakness instance 211. A dynamic test set 221 can contain 1 to n dynamic test cases 222.

As an example, for the weakness instance with identifier "INS-1234", a dynamic test set for the code injection weakness (CWE-ID 94) could be described as follows:

```
<dynamicTestSet xmlns="http://namespaces.softwareag.com/security"
  weaknessInstanceId="INS-1234">
  <dynamicTestCase ID="INS-1234-1">
    . . .
  </dynamicTestCase>
  <dynamicTestCase ID="INS-1234-2">
    . . .
  </dynamicTestCase>
  <dynamicTestCase ID="INS-1234-3">
    . . .
  </dynamicTestCase>
</dynamicTestSet>
```

Example Dynamic Testing

For the dynamic testing, common Dynamic Application Security Testing (DAST) tools may be used in certain example embodiments. Tools in this category provide the functionality useful for the operations described herein. For example, most DAST tools provide APIs or configurators to control the tests that are executed. Depending on the tool that is used to perform the dynamic test 140, the information described in the dynamic test configuration 220 may be transformed into a different syntax, a set of appropriate API calls, and/or the like.

The dynamic test result 230 contains information that allows a verification to be made, for each dynamic test case 222, as to whether this test was able to exploit weakness, making it a vulnerability. Additionally, each dynamic test case 222 is linked to a dynamic test set 221, which in turn is linked to an identified weakness instance id 212.

When using, for example, the commonly used open-source DAST tool OpenVAS, custom test configurations are provided using the Nessus Attack Scripting Language (NASL). OpenVAS comes with a multitude of preconfigured NASL scripts for all common weakness types. When executing the dynamic test 140, each dynamic test case 222 is converted to a configuration in NASL, by using one or more existing NASL scripts provided for identifying the respective type of weakness and adapting them to match the application specific configurations in the dynamic test case 222. Then, the adapted NASL scripts, which each represent a network vulnerability test (NVT), are executed by OpenVAS, and the result is included in the OpenVAS report, the dynamic test result 230, referencing the dynamic test case id 223.

As an example, a network vulnerability test executed for the dynamic test case with the identifier "INS-1234-1" using OpenVAS could return a report that includes the result for this specific test as follows in XML representation:

```
<report . . . >
  . . .
  <results>
    <result . . . >
      <nvt . . . >
        <name>INS-1234-1</name>
        . . .
      </nvt>
    </result>
    <result . . . >
      <nvt . . . >
        <name>INS-1234-3</name>
        . . .
      </nvt>
    </result>
  </results>
  . . .
</report>
```

The content of the "name" element that is the subelement of "nvt" is the id of the dynamic test case 222 that is the source of the network vulnerability test that resulted in the vulnerability being identified.

Example Test Result Analyzer

The test result analyzer 150 uses the dynamic test results 230 and maps each dynamic test case 221 to a respective identified weakness 211 to mark each of the identified weaknesses as being a verified vulnerability and then includes them in the verified static test results 240.

The above shown example of a dynamic test result 230 based on an OpenVAS test execution, gives an extract of an OpenVAS test report, which shows that the "result" element includes the subelement "nvt" and below that the subelement "name" with the content of the dynamic test case id ("INS-1234-1" and "INS-1234-3" in the example). The presence of the dynamic test case ids 223 in the OpenVAS report indicates that the dynamic test execution has found the respective identified weakness instances to be exploitable. Because the dynamic test case ids 223 are constructed in a way to identify the identified weakness instance id 212, this information is used to include a verified weakness into the verified static test result 240.

It will be appreciated that the verified static test results could be provided to a user or development team in a report, log file, dashboard, etc. Additionally, or in the alternative, this and/or other information may be stored to a database or the like. For instance, in certain example embodiments, a listing of verified security weaknesses of the application may be output. The listing may include, for each verified security weakness, an indication of a location of where in the binary and/or source code representation(s) the respective verified security weakness occurs and, optionally, a location of where data causing the respective verified security weakness enters the binary and/or source code representation(s).

Example Code Repairer

The code repairer 160 uses the verified static test result 240 to identify the binaries 310 or source code 320 that needs to be modified to resolve the defects and apply the appropriate modifications. In the verified static test result 240, for each identified weakness instance 211 the occurrence location 214 points to the location in the binaries 310 or source code 320 where the weakness occurs and the application code 300 is to be adapted. Typical approaches may involve replacing the binary libraries that have been identified to be vulnerable with other versions of this library, e.g., based on a look up of the affected library based on the CPE-ID and information in the National Vulnerability Database (NVD) or other trusted source. Coding errors where the source code is available may be repaired by including the required functions to resolve the weakness, such as input validation, output encoding, bounds checking, etc., based on common Enterprise Security APIs (ESAPIs) that are used by the application.

As an example, a verified identified weakness instance might include the following and/or other information:

weakness type: CWE-78 (OS command injection)
occurrence location file: ProcessCommands.java
occurrence location line: 6328

The line 6328 in the file ProcessCommands.java may appear as follows:

Process p=Runtime.getRuntime( ).exec("nslookup"+hostname);

Any variable parameters that are passed to an OS command could potentially be constructed based on input entering the application. Possibly, the static test explicitly identified the variable "hostname" as being the input that results in the weakness. Even if this information was not reported explicitly, the automated code repairer could protect any variable parameters. If the OWASP Enterprise Security API (OWASP ESAPI) is available in the application, the code repairer would have a mapping set up, in which encoding functions are available to fix certain types of weakness types that are sub weaknesses of improper encoding or escaping of output (CWE-116). Since CWE-78 belongs to this type of weakness, the code repairer will have a mapping of CWE-78 to the respective encoding function, which in OWASP ESAPI is the function ESAPI.encodeForOS. Applying the respective encoding function to filter out any characters that could manipulate the OS command, would result in the following modified code line:

Process p=Runtime.getRuntime( ).exec("nslookup"+ESAPI.encodeForOS(codec,hostname));

This change will be automatically applied to the source code 320 and committed to the respective source code repository.

In certain example embodiments, manual verification may be requested or required prior to implementing an automatic change. In certain example embodiments, an indication of how the repair is to be made may be presented to a user for confirmation purposes. In certain example embodiments, a suggestion of how to fix a detected issue may be made so that the user can implement the change manually (e.g., if automatic repair cannot be completed for some reason, such as insufficient rights being granted, severity level or potential impact indicating that manual review is required, etc.). In certain example embodiments, suggestions of multiple possible fixes may be presented to a user before implementing an automatic repair, e.g., in the event that there are multiple possible solutions, where it is unclear that a particular solution may not be successful in remediating the problem, etc.

Example Extension for Different Runtime Environments

Many, if not most, software applications are created not just for one customer/deployment, but rather are designed to be supported on multiple operating systems (e.g., for Linux, Solaris, AIX, Windows) and/or for use in multiple runtime environments (e.g., for different Java Virtual Machines, different Java Servlet Engines, etc.). Each of these environments might make the software application behave slightly differently, implying that dynamic testing in connection with only one such environment might not be sufficient to reveal potential vulnerabilities across multiple different deployments. Thus, the techniques described above might be configured to work with multiple different runtime and/or configurational environments. In this regard, certain example embodiments might be configured to perform static and/or dynamic testing for multiple different runtime and/or configurational environments. The example provided below focuses on dynamic tests performable for multiple different runtime and/or configurational environments. Although there could be platform-specific code in applications that could lead to different results in the static analysis based on the platform, static testing in general already has the information needed to test for such issues, as it can look inside the application. Thus, further technical improvements can come by focusing on dynamic testing, as the runtime execution can be greatly impacted by the runtime environment components that are not part of the software application and therefore cannot always be sufficiently evaluated by the static tests, which results in the static test having to in essence assume the worst, resulting in a high number of false-positives. To help avoid missing any real vulnerabilities, all of the platforms that the software application could be deployed on may be included in the dynamic testing in accordance with certain example embodiments and, for example, using the approach outlined below.

Figure 10:
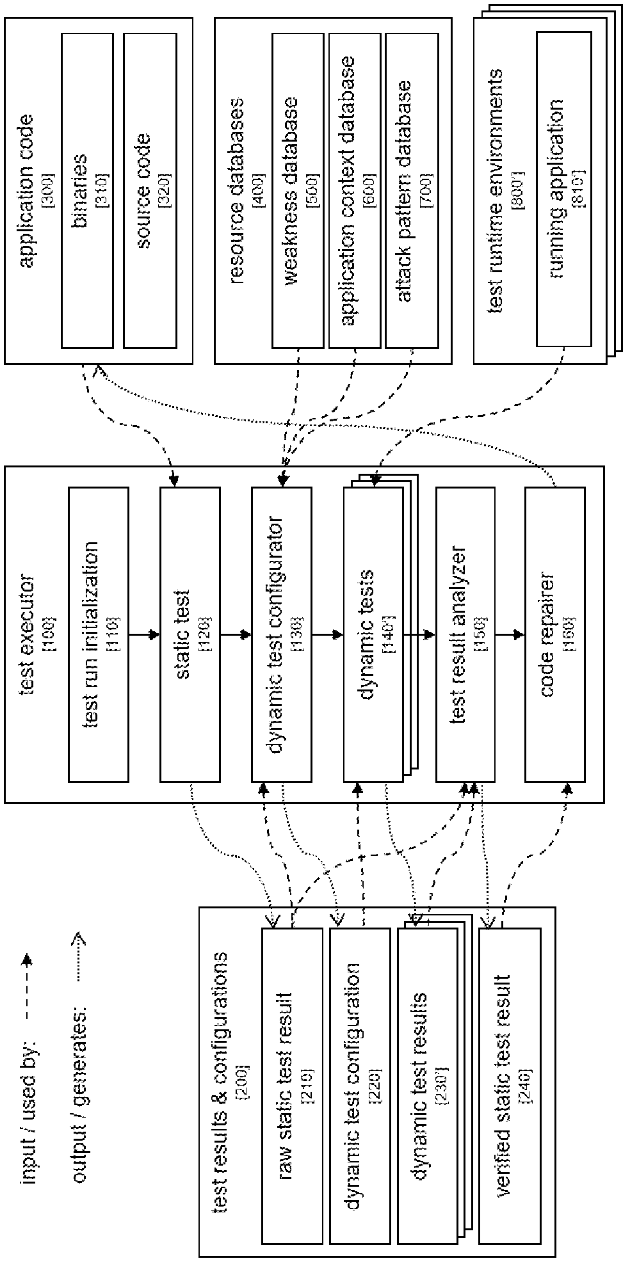
FIG. 10 is a variant of the FIG. 3 block diagram, which may be used in certain example embodiments.

FIG. 10 is a variant of the FIG. 3 block diagram, which may be used in certain example embodiments, and which may help in this regard. For example, to enable dynamic testing for multiple test runtime environments 800' using multiple runtime application instances 810', the test configuration 220 may be modified to execute plural dynamic tests 140' multiple times against the running application instances 810' on these multiple different test runtime environments 800'. The test result analyzer 150 may look at the aggregated dynamic test results 230', marking an identified weakness instance 211 as verified as soon as one of the multiple dynamic test results 230' indicated it as being a vulnerability. In certain example embodiments, multiple different dynamic test results may be needed to confirm a vulnerability. The FIG. 10 example variant, with multiple dynamic tests 140', executed against multiple test runtime environments 800', may result in multiple dynamic test results 230', as depicted in FIG. 10.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of testing an application for security vulnerabilities, the application having binary and/or source code representations, the method comprising:

(a) executing, by using a computer system, a static test process by subjecting the binary and/or source code representations to static testing to generate raw static test results, the raw static test results indicating one or more potential security weaknesses in the application, at least one of the one or more potential security weaknesses being a false-positive;

(b) executing, by using the computer system, a dynamic test process to dynamically generate, for each corresponding potential security weakness of the one or more potential security weaknesses in the application indicated by the raw static test results, a corresponding dynamic test set, including one or more dynamic test cases, each dynamic test set being generated in dependence on (i) the corresponding potential security weakness indicated from the raw static test results, and (ii) lookups to a weakness data set, an application context data set, and an attack pattern data set, wherein the weakness data set includes an enumeration of different weakness types and descriptions thereof, the application context data set includes information specific to the application, and the attack pattern data set includes information about how to generate attacks for the different weakness types enumerated in the weakness data set;

(c) subjecting an instance of the application running in a test runtime environment to execution of the generated dynamic test case(s) to generate dynamic test results, the dynamic test results indicating whether each of the one or more potential security weakness is a verified security weakness of the application, the dynamic test results including fewer false-positives than the raw static test results; and (d) generating, based on execution of the generated dynamic test case(s), a listing of each verified security weakness of the application from among the one or more potential security weaknesses indicated in the application via the raw static test results, wherein the listing of verified security weakness(es) of the application includes, for each verified security weakness, an indication of a location of where in the binary and/or source code representation(s) the respective verified security weakness occurs.

2. The method of claim 1, further comprising automatically modifying the binary and/or source code representation (s) of the application to repair one or more of the verified security weaknesses.

3. The method of claim 1, wherein the binary and/or source code representations stored to a first data store and are accessed via a first set of data exchange interfaces.

4. The method of claim 1, wherein the instance of the application running in the test runtime environment is subjected to the generated dynamic test case(s) by using a second set of data exchange interfaces.

5. The method of claim 4, wherein the second set of data exchange interfaces include an API and/or a command line interface.

6. The method of claim 1, wherein the raw static test results indicating one or more potential security weaknesses in the application each include an identifier for each potential security weakness, a first location of where in the binary and/or source code representation(s) the respective potential security weakness is caused to occur, and a second location of where data causing the potential security weakness enters the binary and/or source code representation(s), and wherein the identifier specifies an entry in the weakness data set.

7. The method of claim 6, wherein the first and/or second locations identify(ies) a file and a location within that file and/or an electronic interface.

8. The method of claim 6, wherein each dynamic test case includes at least one attack vector, the attack vector(s) being generated using the second location and in connection with the attack pattern data set, the attack vector(s) being executed against the instance of the application running in the test runtime environment during the dynamic testing.

9. The method of claim 1, wherein each potential security weakness is assigned a severity score during the generation of the raw static test results; and further comprising automatically modifying the binary and/or source code representation(s) of the application to repair one or more of the verified security weaknesses in an order determined by respective severity scores.

10. The method of claim 1, further comprising:

automatically modifying the binary and/or source code representation(s) of the application to repair one or more of the verified security weaknesses output in (d); and repeating (a)— (d) until no verified security weaknesses result from the dynamic testing.

11. The method of claim 1, wherein dynamic tests are performed for a plurality of instances of the application running in different test runtime environments, and wherein dynamic test results are collected for the different instances.

12. A non-transitory computer readable storage medium tangibly storing a program for testing an application for security vulnerabilities, the application having binary and/or source code representations, the program, when executed by a computing system including at least one processor, performing functionality comprising:

(a) executing a static test process by subjecting the binary and/or source code representations to static testing to generate raw static test results, the raw static test results indicating one or more potential security weaknesses in the application, at least one of the one or more potential security weaknesses being a false-positive;

(b) executing a dynamic test process by dynamically generating, for each corresponding potential security weakness of the one or more potential security weaknesses in the application indicated by the raw static test results, a corresponding dynamic test set, including one or more dynamic test cases, each dynamic test set being generated in dependence on (i) the corresponding potential security weakness, and (ii) lookups to a weakness data set, an application context data set, and an attack pattern data set;

wherein the weakness data set includes an enumeration of different weakness types and descriptions thereof, the application context data set includes information specific to the application, and the attack pattern data set includes information about how to generate attacks for the different weakness types enumerated in the weakness data set;

(c) subjecting an instance of the application running in a test runtime environment to execution of the generated dynamic test case(s) to generate dynamic test results, the dynamic test results indicating whether each of the one or more potential security weakness is a verified security weakness of the application, the dynamic test results including fewer false positives than the raw static test results; and (d) generating, based on execution of the generated dynamic test case(s), a listing of each verified security weakness of the application from among the one or more potential security weaknesses indicated in the application via the raw static test results, wherein the listing of verified security weakness(es) of the application includes, for each verified security weakness, an indication of a location of where in the binary and/or source code representation(s) the respective verified security weakness occurs.

13. The non-transitory computer readable storage medium of claim 12, wherein the program, when executed, is further configured to at least automatically modify the binary and/or source code representation(s) of the application to repair one or more of the verified security weaknesses.

14. The non-transitory computer readable storage medium of claim 12, wherein the raw static test results indicating one or more potential security weaknesses in the application each include an identifier for each potential security weakness, a first location of where in the binary and/or source code representation(s) the respective potential security weakness is caused to occur, and a second location of where data causing the potential security weakness enters the binary and/or source code representation(s), and wherein the identifier specifies an entry in the weakness data set.

15. The non-transitory computer readable storage medium of claim 14, wherein each dynamic test case includes at least one attack vector, the attack vector(s) being generated using the second location and in connection with the attack pattern data set, the attack vector(s) being executed against the instance of the application running in the test runtime environment during the dynamic testing.

16. A computing system for testing an application for security vulnerabilities, the application having binary and/or source code representations, the computing system comprising:

at least one processor; and a first electronic interface to an instance of the application running in a test runtime environment;

the at least one processor being configured to control the computing system to at least:

(a) execute a static test process by subjecting the binary and/or source code representations to static testing to generate raw static test results, the raw static test results indicating one or more potential security weaknesses in the application, at least one of the one or more potential security weaknesses being a false-positive;

(b) executing a dynamic test process by dynamically generating, for each corresponding potential security weakness of the one or more potential security weaknesses in the application indicated by the raw static test results, a corresponding dynamic test set, including one or more dynamic test cases, each dynamic test set being generated in dependence on (i) the corresponding potential security weakness indicated from the raw static test results, and (ii) lookups to a weakness data set, an application context data set, and an attack pattern data set, wherein the weakness data set includes an enumeration of different weakness types and descriptions thereof, the application context data set includes information specific to the application, and the attack pattern data set includes information about how to generate attacks for the different weakness types enumerated in the weakness data set;

(c) subject the instance of the application running in the test runtime environment to execution of the generated dynamic test case(s) to generate dynamic test results, the dynamic test results indicating whether each of the one or more potential security weakness is a verified security weakness of the application, the dynamic test results including fewer false positives than the raw static test results; and (d) generate, based on execution of the generated dynamic test case(s), a listing of each verified security weakness of the application from among the one or more potential security weaknesses indicated in the application via the raw static test results, weakness(es) of the application includes, for each verified security weakness, an indication of a location of where in the binary and/or source code representation(s) the respective verified security weakness occurs.

17. The system of claim 16, wherein the at least one processor is further configured to control the system to at least automatically modify the binary and/or source code representation(s) of the application to repair one or more of the verified security weaknesses.

18. The system of claim 16, wherein the binary and/or source code representations stored to a first data store and are accessed via a second electronic interface.

19. The system of claim 16, wherein the first electronic interface includes API and/or a command line interface.

20. The system of claim 16, wherein the raw static test results indicating one or more potential security weaknesses in the application each include an identifier for each potential security weakness, a first location of where in the binary and/or source code representation(s) the respective potential security weakness is caused to occur, and a second location of where data causing the potential security weakness enters the binary and/or source code representation(s), and wherein the identifier specifies an entry in the weakness data set.

21. The system of claim 20, wherein the first and/or second locations identify(ies) a file and a location within that file and/or an electronic interface.

22. The system of claim 20, wherein each dynamic test case includes at least one attack vector(s), the attack vector (s) being generated using the second location and in connection with the attack pattern data set, the attack vector(s) being executed against the instance of the application running in the test runtime environment during the dynamic testing.

23. The system of claim 16, wherein each potential security weakness is assigned a severity score during the generation of the raw static test results; and wherein the at least one processor is further configured to control the system to at least automatically modify the binary and/or source code representation(s) of the application to repair one or more of the verified security weaknesses in an order determined by respective severity scores.

24. The system of claim 16, wherein the at least one processor is further configured to control the system to at least:

automatically modify the binary and/or source code representation(s) of the application to repair one or more of the verified security weaknesses output in (d); and repeat (a)— (d) until no verified security weaknesses result from the dynamic testing.

25. The system of claim 16, wherein dynamic tests are performed for a plurality of instances of the application running in different test runtime environments, and wherein dynamic test results are collected for the different instances.

* * * * *